United States Patent [19]

Patil et al.

[11] 4,256,508

[45] Mar. 17, 1981

[54] IRON OXIDE PIGMENTS WITH IMPROVED COLOR STRENGTH

[75] Inventors: Arvind S. Patil, Grosse Ile, Mich.; Lowell E. Netherton, Summit, N.J.

[73] Assignee: BASF Wyandotte Corporation, Wyandotte, Mich.

[21] Appl. No.: 53,236

[22] Filed: Jun. 29, 1979

[51] Int. Cl.³ .............................................. C09C 1/24
[52] U.S. Cl. .................................... 156/304; 106/309
[58] Field of Search ................ 106/304, 309, 308 B; 428/403, 538, 404, 539

[56] References Cited

U.S. PATENT DOCUMENTS

| | | | |
|---|---|---|---|
| 1,967,235 | 7/1934 | Ferkel | 106/304 |
| 2,558,302 | 6/1951 | Marcot et al. | 106/304 |
| 3,166,430 | 1/1965 | Seabright | 106/304 |
| 3,171,753 | 3/1965 | Olby | 106/304 |
| 3,189,475 | 6/1965 | Marquis et al. | 106/304 |
| 3,442,678 | 5/1969 | Ross | 106/300 |
| 3,946,134 | 3/1976 | Sherman | 106/308 B |

*Primary Examiner*—O. R. Vertiz
*Assistant Examiner*—Mark Bell
*Attorney, Agent, or Firm*—Bernhard R. Swick

[57] ABSTRACT

Improved transparent iron oxide pigments having increased color strength are achieved through the incorporation of fluoride with the crystals or particles of the iron oxide. These pigments may be prepared by the process which comprises reacting an aqueous solution of a water-soluble iron salt with an alkaline precipitating agent wherein a fluoride salt is added to the solution or to the reaction product.

15 Claims, No Drawings

IRON OXIDE PIGMENTS WITH IMPROVED COLOR STRENGTH

BACKGROUND OF THE INVENTION

1. Field of the Invention

The present invention pertains to iron oxide pigments. More particularly, the present invention pertains to synthetic iron oxide pigments. Even more particularly, the present invention concerns improved methods of producing synthetic iron oxide pigments and in particular, yellow transparent iron oxide pigments and the improved pigments produced thereby.

2. Prior Art

Iron oxide pigments are produced from natural sources as well as by synthetic techniques. Generally, the naturally occurring iron oxides are both weaker and dirtier in color than their synthetic counterparts due to impurities in the oxides. Inherently, the natural pigments are opaque or semi-opaque due to their coarse particle size. The synthetic pigments minimize these disadvantages.

One class of synthetic iron oxide pigments that are coloristically unique are the relatively pure iron oxide pigments produced by solution reactions. These pigments are commonly referred to as transparent iron oxide pigments. They exhibit a high level of transparency resulting from the inherent crystalline structure of the pigment and fine crystallite size resulting from the method of manufacture. Transparent iron oxide pigments, which are extensively used in automotive metallic finishes, are generally yellow or red. Transparent yellow iron oxide pigments are produced by precipitation with an alkaline solution from water-soluble iron salts both ferric and ferrous, followed by filtration, washing and drying thereof. The transparent red iron oxide pigments are produced by calcining transparent yellow iron oxide pigments.

Transparent iron oxide pigments are ordinarily displayed in coating applications requiring high transparency while retaining an appropriate resistance to UV degradation of the organic binder upon prolonged exposure to natural sunlight. However, they are deficient in their tinctorial strength and chroma. The yellow pigment particularly suffers from lack of color strength. This makes its use in applications, such as printing ink and plastics, rather uneconomical, especially where it seeks to replace more expensive organic pigments such as azo-yellows that generally have higher color strength. Use of chrome yellow is also increasingly being objected to on environmental grounds. Thus, improvement in the color strength (or tinting strength) of yellow iron oxide would be of commercial significance.

The present invention, as will subsequently be detailed, improves upon the color strength of the yellow transparent iron oxide pigment.

Typically, transparent yellow iron oxide pigment is prepared by reacting an aqueous solution of a water-soluble iron salt such as ferrous chloride, ferrous sulfate, ferric chloride or ferric sulfate with an alkaline precipitating agent such as an alkali metal hydroxide or carbonate or an alkaline earth metal hydroxide. In U.S. Pat. No. 2,558,302, there is disclosed a process for the production of transparent yellow iron oxide pigment utilizing from a stoichiometric equivalent to an excess of strong alkali per mole of ferrous iron. Furthermore, the reference teaches the reaction being carried out at elevated temperatures and extended periods of oxidation. As above noted, the present invention modifies the referenced process to provide transparent iron oxide pigments of improved color strength.

STATEMENT OF RELEVANT PATENTS

To the best of applicants' knowledge, the following patents are the ones most relevant to a determination of patentability:

| U.S. Pat. No. | Inventor | Issue Date | Assignee |
|---|---|---|---|
| 1,967,235 | Ferkel | 07/24/1934 | None on face |
| 3,166,430 | Seabright | 01/19/1965 | Harshaw Chem. Co. |
| 3,171,753 | Olby | 03/02/1965 | Associated Lead Mfg. (London) |
| 3,189,475 | Marquis et al | 06/15/1965 | Glidden Company |
| 3,442,678 | Ross | 05/16/1969 | PPG Industries |

The most pertinent of these patents is U.S. Pat. No. 3,442,678 to Ross. This patent discloses a slurry of metal oxide digested in the presence of at least one soluble fluorine-containing compound. The patent says that it has been discovered that when a raw pigment slurry is digested in accordance with the invention, e.g., in the presence of a soluble fluoride compound, there results a significant improvement in the pigment properties, particularly, tint efficiency and tinting strength. While in the last paragraph, column 5, the patent says:

"Examples not by way of limitation of metal oxides which may be treated by the aforementioned process, are the oxides of . . . "

followed by a list of several oxides including iron, it is apparent from the specification and claims that the patent and the invention are really directed to titanium oxide. Further, the patent is directed to metal oxides produced by vapor phase oxidation and says in column 1, line 44:

"Such vapor phase oxidation or hydrolysis processes commonly referred to as chloride processes are readily distinguishable from the so-called sulfate processes . . . "

The remaining patents all disclose a combination of iron oxide with a halide but are otherwise not particularly pertinent. U.S. Pat. Nos. 3,166,430; 3,171,753; and 3,189,475 all relate to pigments or stains for ceramics or ceramic glazes which incorporate iron oxide and fluoride along with other oxides such as zirconium oxide, silicon oxide, etc., which are calcined.

SUMMARY OF THE INVENTION

In accordance with the present invention, improved transparent iron oxide pigments having increased color strength are achieved through the incorporation of fluoride with the crystals or particles of the yellow iron oxide. It is preferred to incorporate fluoride with the yellow iron oxide in the amount of about 1 to 100 mole percent based on the amount of iron oxide. However, a stoichiometric amount of fluoride is not necessary for improved color strength since it was found that only the fluoride on the surface of the pigment particles contributed to the improved color strength. Generally, optimum results were obtained when 20 to 25 mole percent of fluoride was added to the pigment which generally resulted in 15 to 20 mole percent of fluoride being incorporated with the pigment crystals or particles.

The preferred method of incorporating fluoride with the yellow transparent iron oxide particles or crystals comprises adding soluble fluoride salt to the iron salt solution prior to precipitation of the iron oxide with the alkaline precipitating agent. U.S. Pat. No. 2,558,302 says that at all times, the iron salt solution should be added to the alkali. However, it has been found, in accordance with the instant invention, that the alkali could be added to the iron salt solution. While the presence of soluble fluoride prior to the precipitation is ideal, a somewhat diminished effect is also produced when fluoride is added after the precipitation.

For a more complete understanding of the present invention, reference is made to the following detailed description and accompanying examples.

DESCRIPTION OF THE PREFERRED EMBODIMENTS

As hereinabove noted, the present invention is directed to an improved transparent iron oxide pigment having enhanced color strength by incorporating fluoride as a coating on the surface of the iron oxide particles. The preferred method of producing this product is by solution precipitation reaction generally comprising:

(a) reacting a water-soluble iron salt with either an alkaline earth metal hydroxide, alkali metal hydroxide, or alkali metal carbonate in a water solution containing fluoride ions, generally provided by dissolving a water-soluble fluoride salt therein;

(b) oxidizing the solution of reaction mixture;

(c) heating the reaction mixture to elevated temperature after oxidation;

(d) separating the precipitate from the solution;

(e) washing the precipitate to remove excess soluble salt to obtain a transparent iron oxide pigment; and (f) optionally, calcining the pigment to alter the hue of the pigment.

It is preferred to incorporate fluoride with the iron oxide pigment in the amount of about 1 to 100 mole percent based on the amount of iron oxide and preferably, 20 to 25 mole percent in order to get a preferred amount of from 15 to 20 mole percent of fluoride actually on the surface of the crystal or particles. The preferred fluoride salts are NaF and KF.

The hydroxide or carbonate is reacted with the iron salt at a temperature of about 5° to 50° C.

In carrying out the solution precipitation reaction, the hydroxide or carbonate is employed in an amount ranging from less than a stoichiometric equivalent amount thereof, based on the amount of iron to a stoichiometric equivalent amount thereof. Preferably, from about 75 percent to about 100 percent of the stoichiometric equivalent amount of the hydroxide or carbonate is employed.

Useful hydroxides, as noted, are the alkaline earth metal and alkali metal hydroxides. Representative hydroxides are sodium hydroxide, calcium hydroxide, potassium hydroxide, lithium hydroxide, barium hydroxide and the like. The useful carbonates are alkali metal carbonates such as sodium carbonate, potassium carbonate and the like, as well as mixtures thereof. Preferably, the precipitating agent is sodium carbonate.

The iron salts used herein, as noted, are water-soluble iron salts of varying valences. Hence, both ferric and ferrous salts may be used. Representative salts include ferrous chloride, ferrous sulfate, ferric chloride, ferric sulfate and the like. Water-soluble salt solutions are prepared by merely dissolving the iron salt in water. It is to this salt solution to which the precipitating agent is added at the reduced temperatures hereinabove defined.

During the reaction between the salt and the precipitating agent, the reaction mixture is subjected to oxidation in order to oxidize the ferrous ion to the ferric ion. When water-soluble ferric salts are employed, no oxidation is necessary. Oxidation of the reaction mixture is achieved either through aeration of the reaction mixture or by the addition of an oxidizing agent thereto or both. When aeration is employed, the reaction mixture is aerated for about one-half to eight hours and, preferably, from about one-half to four hours. In aerating the mixtures, however, no more than five hours of aeration is employed.

Suitable oxidizing agents are, for example, hydrogen peroxide, sodium nitrite and the like. These oxidizing agents are preferred since they do not impart any coloration to the pigments as would otherwise occur with oxidants such as permanganates, chromates, dichromates and the like. The oxidizing agent is, generally, employed in an amount ranging from about one hundred percent to about four hundred percent on a stoichiometric equivalent basis. Oxidizing converts the ferrous ion to the ferric state.

After the iron salts have been oxidized, the reacted mixture is heated to a temperature ranging from about 70° to about 100° C. for a period ranging from about 1 to 20 hours. Preferably, the mixture is heated to about 80° to 95° C. for about 4 to 12 hours to age the crystal.

Subsequent to heating, the mixture is cooled to ambient temperature and the precipitate separated from the mixture. Separation is achieved by any suitable mode such as filtration or the like. The precipitate is then washed to remove any excess or residual water-soluble salts and dried prior to subsequent processing.

After the precipitate is recovered, washed and dried, the pigment may then be calcined to obtain different hues of the transparent iron oxide pigments hereof. Calcination, where used, proceeds at a temperature ranging from 280° to 580° C. for about 0.25 to 0.5 hour, under batch conditions and up to about 800° C. under continuous conditions. Where a continuous calcination is employed, residence or dwell time ranges from about 0.1 to 1 hour and normally ranges from about 0.15 to 0.5 hour.

While the above described procedure is preferred, the fluoride may be added subsequent to precipitation and either prior to or subsequent to the heating step. Under this procedure, the fluoride is generally added subsequent to the oxidation step when ferrous salts are employed.

The pigments obtained hereby are transparent iron oxide pigments of enhanced color strength.

For a more complete understanding of the present invention, reference is made to the following illustrative examples thereof.

Drawdowns of the pigment on an aluminum card, as called for in the Examples, is accomplished by weighing out 1.5 grams of the pigment, transferring it into a 4 ounce bottle and adding 4.5 grams of a thermoset acrylic vehicle along with 100 grams of 2 millimeter glass beads. The bottles are capped tightly and mixed for 2 hours by mechanical shaking on a paint shaker. 24 more grams of the vehicle are then added; the bottle is capped and shook for another 10 minutes. The beads are filtered out and the filtrate caught in 10 milliliter bottles. A small amount of the dispersed pigment sample of the invention containing NaF is poured onto a glossy aluminum card. A small amount of a control pigment, i.e., an otherwise identical pigment which does not incorporate NaF, is poured onto the same card a short distance from the first pigment. With a 60 micron spiral, both pools of pigment are drawn down to the bottom of the card with a steady, firm pull. The drawdown is then air dried for 10 minutes and oven dried for 20 minutes in an oven at 130° C. The drawdowns on a black and white card are prepared in a similar manner using a 100 micron spiral. These spirals, which are well known in the paint and coating industry, are wire wound rods designed to leave a film of constant thickness.

In the examples, all parts and percentages are by weight, and all temperatures are in degrees Centigrade absent indications to the contrary.

EXAMPLE I

In a suitable reaction vessel equipped with stirring means and cooling means, was dissolved about 80 grams of ferrous sulfate heptahydrate ($FeSO_4.7H_2O$) in about 3 liters of water. 12.6 grams of NaF was then added. The pH of the solution was about 2.6.

With agitation, 150 milliliters of a solution of 167 grams per liter sodium carbonate in water was added to the ferrous iron solution. Upon addition of the carbonate, precipitation occurred. After precipitation was completed, the mixture was aerated for about one-half hour. Oxidation of the ferrous ion was monitored using potassium permanganate titration. After the oxidation was completed, the reaction mixture was heated to about 90° C. and held there for one hour. Thereafter, the mixture was cooled to ambient conditions. The precipitate was then separated from the liquid by filtration, washed and dried to obtain a yellow transparent iron oxide pigment. The pigment was then ground to serve as a toner. Drawdowns of the pigment with and without NaF were prepared simultaneously on an aluminum card and on a black and white card in the manner described above. The drawdowns of the pigment which incorporated the NaF showed greatly improved color strength over the drawdowns using the pigment that did not incorporate the NaF.

EXAMPLE II

The reactions and conditions of Example I were repeated. However, only 3.2 grams of NaF were used. The drawdowns of the so-produced pigment prepared as described above incorporating NaF showed great improvement in color strength over those of the control which did not incorporate NaF.

EXAMPLE III

In a suitable reaction vessel equipped with stirring means and cooling means was dissolved ferrous sulfate heptahydrate ($FeSO_4.7H_2O$) in water in amount sufficient to have a concentration of 57 grams per liter. 1270 grams NaF was added to 150 gallons of such solution in the reaction vessel.

With agitation, a solution of 14 gallons of a 178 gram per liter sodium carbonate solution in water was added to the ferrous iron solution. Upon addition of the carbonate precipitation occurred. After precipitation was completed, the mixture was aerated for 4 hours. Oxidation of the ferrous ion was monitored using potassium permanganate titration. After oxidation was completed, the reaction mixture was heated to about 90° C. The precipitate was then separated from the liquid by filtration; washed and dried to obtain a yellow transparent iron oxide pigment which was then ground to serve as a toner. Drawdowns of the pigment with and without NaF were prepared simultaneously on an aluminum card and on a black and white card in the manner described above. The drawdowns from the pigment containing the NaF showed greatly improved color strength over those which did not incorporate the NaF.

Similar improvements in color strength may be obtained where fluoride is added in the form of KF. Similar results are also achieved where potassium carbonate, sodium hydroxide and potassium hydroxide are used in lieu of sodium carbonate for precipitating the iron oxide. Similar results are also obtained when in a conventional pigment preparation, NaF is added after oxidation is complete, either prior to or subsequent to heating.

Having thus described the invention, what is claimed is:

1. In the process for the production of transparent iron oxide pigments by reacting an aqueous solution of a water-soluble iron salt with an alkaline precipitating agent, the improvement comprising adding a fluoride salt to said solution or to the reaction product.

2. The process of claim 1 wherein said water-soluble iron salt is selected from the group consisting of ferric chloride, ferric sulfate, ferrous chloride, ferrous sulfate and mixtures thereof, the alkaline precipitating agent is selected from the group consisting of alkali metal hydroxide, alkali metal carbonate, alkaline earth metal hydroxide and mixtures thereof and said fluoride salt is selected from the group consisting of sodium fluoride, and potassium fluoride.

3. The process of claim 2 wherein said iron salt is selected from the group consisting of ferrous chloride and ferrous sulfate, said reaction mixture is oxidized followed by heating to an elevated temperature and said fluoride salt is added subsequent to said oxidation.

4. The process of claim 2 wherein said reaction mixture is heated to a temperature of about 70° to 100° C. for a period of about 1 to 20 hours subsequent to precipitation.

5. The process of claim 1 wherein said fluoride salt is added to said solution prior to precipitation.

6. The process of claim 5 wherein said water-soluble iron salt is selected from the group consisting of ferric chloride, ferric sulfate, ferrous chloride, ferrous sulfate and mixtures thereof, the alkaline precipitating agent is selected from the group consisting of alkali metal hydroxide, alkali metal carbonate, alkaline earth metal hydroxide and mixtures thereof and said fluoride salt is selected from the group consisting of sodium fluoride and potassium fluoride.

7. The process of claim 6 wherein said iron salt is selected from the group consisting of ferrous chloride and ferrous sulfate and said reaction mixture is oxidized followed by heating to an elevated temperature.

8. The process of claim 7 wherein said iron salt is ferrous sulfate, said alkaline precipitating agent is sodium carbonate and said fluoride salt is sodium fluoride.

9. The process of claim 8 wherein said oxidation is accomplished by the aeration of the reaction mixture for from about 0.5 to 8 hours.

10. The process of claim 9 wherein said reaction mixture is heated to a temperature of about 70° to 100° C. for a period of about 1 to 20 hours subsequent to oxidation.

11. The process of claim 10 wherein the amount of fluoride is about 1 to 100 mole percent based on the amount of iron oxide, the alkaline precipitating agent is employed in an amount ranging from less than a stoichiometric equivalent amount based on the amount of iron to a stoichiometric equivalent amount thereof and said precipitation is carried out at a temperature of about 5° to 50° C.

12. The process of claim 11 wherein said precipitated pigment is separated from the solution by filtration and washed.

13. A transparent iron oxide pigment having increased color strength characterized by fluoride coating on the particles of said pigment wherein said iron oxide pigment is the reaction product of an aqueous solution of a water-soluble iron salt with an alkaline precipitating agent and said fluoride coating is obtained by adding a fluoride salt to said aqueous water-soluble iron salt solution or to the reaction product subsequent to precipitation.

14. The pigment of claim 13 wherein the amount of said fluoride is about 1 to 100 mole percent based on the amount of iron oxide.

15. The pigment of claim 14 wherein the amount of said fluoride is about 15 to 20 mole percent based on the amount of iron oxide.

* * * * *